Aug. 10, 1943.  V. T. O'CONNOR ET AL  2,326,162
APPARATUS FOR USE IN PREPARING POULTRY FOR THE MARKET
Filed Oct. 12, 1940
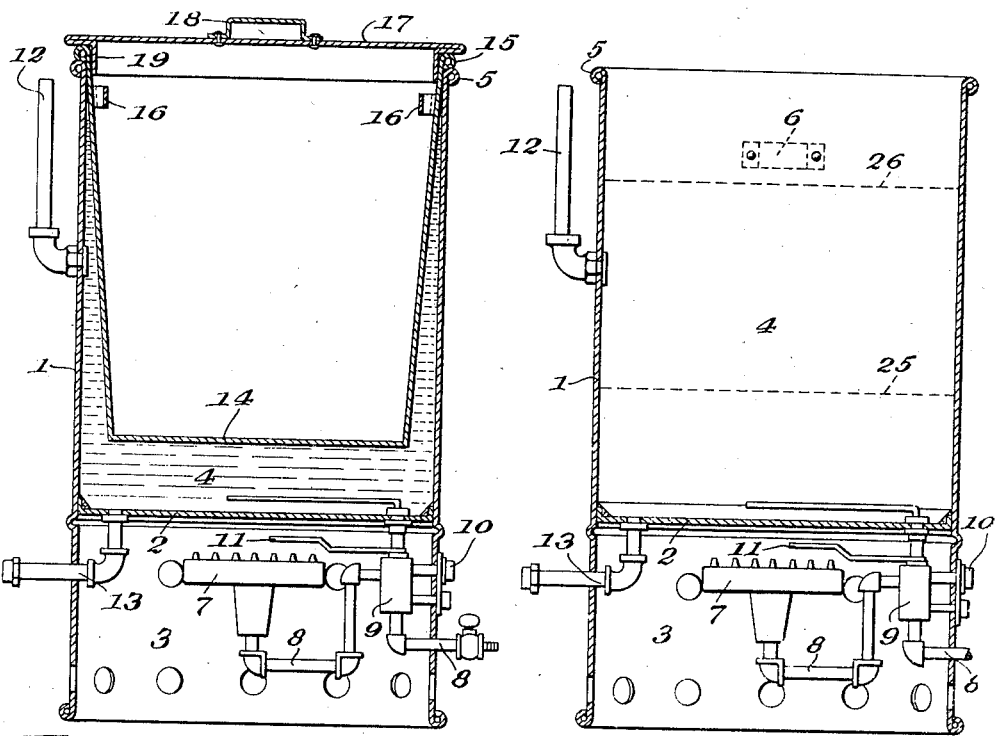
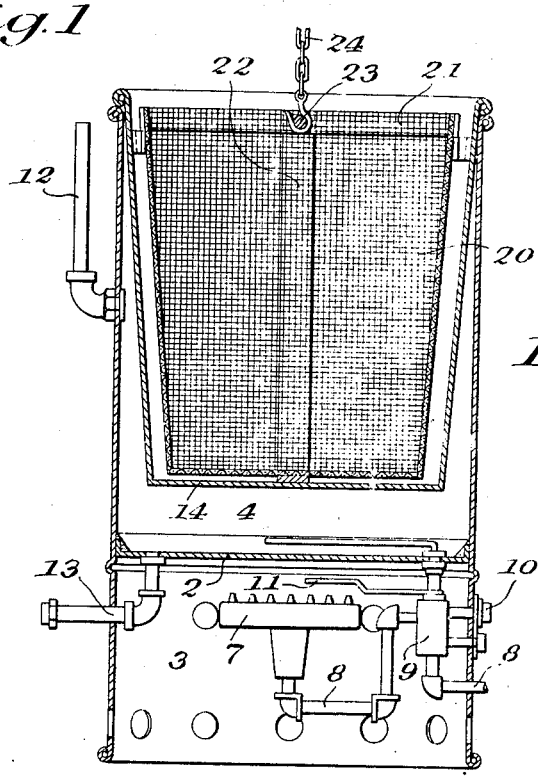
INVENTORS:
Winfield C. Gardiner and
Vincent T. O'Connor
BY
Spear, Rawlings & Spear
ATTORNEYS Patented Aug. 10, 1943

2,326,162

UNITED STATES PATENT OFFICE 2,326,162

APPARATUS FOR USE IN PREPARING POULTRY FOR THE MARKET

Vincent T. O'Connor, Revere, Mass., and Winfield C. Gardiner, Derry, N. H.

Application October 12, 1940, Serial No. 360,942

4 Claims. (Cl. 17—11.1)

Our present invention relates to apparatus for use in preparing poultry for the market.

The preparation of poultry for the market includes two operations with which our invention is primarily concerned. These operations are the semi-scalding and the waxing steps. In the former, the birds are immersed in water heated to a temperature high enough to loosen the feather holding muscles without injury to the flesh so that the larger feathers may be easily plucked. In the latter, the partially plucked birds are dipped into a wax preparation under a similar temperature control and after the wax coating has solidified, its removal carries with it remaining feathers, dirt, and the like.

These two operations are essential to market preparation of poultry and their cost and effectiveness have a direct relationship to the profit of those engaged in the business. Apparatus of several different types has been provided for use in carrying out these operations, but these, in accordance with our analysis of the problems, are high in operating costs and relatively low in efficiency.

Among the factors contributing to the inadequacy of such apparatus, high heating costs may be mentioned as the most serious, although relative safety, difficulty and cost of operation, original cost and the like, are all important.

In accordance with our invention, we provided a water tank with a thermostatically controlled heater in its base and a wax tank shaped to be inserted into the water tank and to be supported thereby to establish a surrounding water jacket. The capacity of the water tank, when the wax tank is inserted, is relatively small and is in fact much less than that required for the semi-scalding operation. We heat this water to a temperature slightly less than its boiling point so that the wax preparation is melted relatively quickly. While both the water and the wax are far too hot for use, the addition of a sufficient volume of cooler water to permit the birds to be immersed therein, reduces the temperature to or slightly below the desired semi-scalding temperature and the thermostatic control is reset to maintain the water at that temperature during the semi-scalding operation.

When the birds have been semi-scalded and partially plucked, water is withdrawn from the water tank, leaving sufficient for the complete jacketing of the wax tank when it is replaced in the water tank. The temperature of the wax is maintained at a suitable temperature during the waxing operation, which temperature is generally in the same range as the semi-scalding temperatures, but depending on the particular wax formula employed.

As the wax and feathers are stripped from the birds, they are placed in a strainer, which is replaced in the wax tank as a final operation, and the thermostatic control reset to its high position. When the wax is again in a liquid state, the strainer with the feathers and the like may be removed, leaving the wax in condition for re-use.

Our invention has many novel features and advantages. Of these, the fuel economy is of great importance as is the fact that either the semi-scalding operation or the waxing operation may be carried out with a single heater, resulting in reduced equipment cost.

In the accompanying drawing, we have shown and in the specification described typical apparatus and methodical steps in accordance with our invention from which its novel features and advantages will be readily apparent.

In the drawing:

Fig. 1 is a vertical section through apparatus in accordance with our invention showing the wax tank inserted.

Fig. 2 shows the apparatus of Fig. 1 with the wax tank removed and the water levels indicated prior to and when the apparatus is prepared for the semi-scalding operation, and Fig. 3 shows the apparatus of Fig. 1 with the wax strainer inserted in the wax tank.

In Fig. 1 we have shown an embodiment of apparatus in accordance with our invention in which a cylindrical shell 1 is divided by a partition 2 to establish a base 3 and a water tank 4. The rim of the shell 1 is formed with a bead 5. Handles to facilitate the movement of the apparatus are indicated at 6. (See Fig. 2.)

The heating means are located in the base 3 and, while these may be of any type, we have shown a gas burner unit 7 since the quick hot heat provided by that fuel affords maximum efficiency and economy. The fuel line 8 for the burner unit 7 includes a thermostatic control 9 by which the temperature of the water in the tank 4 may be accurately controlled. The thermostatic control includes an adjustable knob 10 exteriorly of the base 3, permitting the heat to be controlled accurately within the range of 100° to 210° F. The control 9 includes a safety control, the heat responsive element of which is indicated at 11, to shut off the gas if the flame is accidentally extinguished. As these controls are of standard construction and their operation obvious, we have not described or shown them in detail.

The shell 1 carries an upstanding filling pipe 12, the open end of which terminates slightly below the bead 5, while a drain pipe 13 supported by the partition 2 and the shell 1, permits the tank 4 to be emptied. The filling pipe 12 may be employed as a vent.

At 14 we have shown a slightly tapered wax tank, shaped to fit within the tank 4, and to be spaced inwardly of the shell 1 and above the partition 2 to permit substantially the entire area of the tank 14 to be surrounded by a water jacket of definite volume when the apparatus is assembled as shown in Fig. 1. The upper edge of the tank 14 is formed as a bead 15 to contact and be supported by the bead 5. Handles 16, interiorly of the wax tank 14 and spaced below the bead 15, facilitate the handling of the wax tank. A cover 17, having a handle 18, includes a flange 19 and is adapted to be fitted within the mouth of the tank 4 or the wax tank 14.

We also provide a strainer 20 preferably shaped similarly to the wax tank 14. The strainer 20 has a frame consisting of the rim 21 and the sides 22 to reinforce the reticulated side and bottom walls. The rim 21 supports a lifting bar 23 to which a lifting chain 24 may be attached as shown in Fig. 3. The strainer 20 is shaped to fit within the wax tank 1 and to be centered by the handles 16 so that its sides are not in contact with the walls of the tank 14.

With this description of typical equipment, the methodical steps of treating poultry in accordance with our invention may now be considered.

Before the birds are to be prepared for market, the equipment is assembled as shown in Fig. 1 and sufficient water is admitted to the tank 4 to establish a suitable jacket entirely surrounding all but the extreme upper part of the wax tank 14. Wax to be melted is placed in the tank 14 and the heater is started with the thermostat set at a temperature slightly below 212° F. Because the volume of water to be heated is relatively small and the water jacket completely surrounds the tank 14, the wax is melted relatively rapidly. While the wax, when melted, is at a temperature too high for use, we have found that the high temperatures are of advantage to the conditioning of the wax for use.

After the wax has completely melted, the wax tank 14 is removed and set aside. The water now in the tank 4 is at a temperature too high for use and is of a volume insufficient to permit birds to be immersed therein. We next add to the definite volume of superheated water, indicated in Fig. 2 by the dotted line 25, cooler water until there is a sufficient volume represented by the dotted line 26 in Fig. 6 for the semi-scalding operation. The addition of such a volume of water brings the water to or below the temperature range suitable for semi-scalding poultry, depending on the volume of cooler water added. The thermostat is then re-set to establish a temperature suitable for semi-scalding, for example, 130° F. and to maintain it accurately at the selected temperature. The volume of water may be varied and, with a little experience, an operator becomes skilled in adjusting the volume of water to the number of birds requiring semi-scalding treatment. The birds are then immersed in the water in the tank 4 to loosen their feather holding muscles and the larger feathers are plucked. The wax tank 14 is replaced in the tank 4 with the water level reduced to its proper level (see Fig. 1). The temperature of the wax is thus maintained or reheated to its correct zone by the water in the tank 4 already at the desired temperature. If the wax is too hot, cold water may be added to the wax. The partially plucked birds are then dipped in the wax and, after the wax has solidified, the wax is removed, taking with it the remaining feathers, dirt, and the like.

The wax removed from the poultry is placed in the strainer 20, and when all of the birds have been treated, the strainer 20 is inserted into the wax tank 14. (See Fig. 3.) The thermostatic control may now be re-set to a higher point, say 210° F. and after the wax has re-melted, the strainer 20 may be removed, leaving the strained wax in the wax tank 14 in condition for re-use.

In accordance with our invention, we are thus able to ensure efficiency and economy in the market preparation of poultry.

What we therefore claim and desire to secure by Letters Patent is:

1. Apparatus for use in preparing poultry for the market, said apparatus comprising a base, a water tank on said base having a water inlet and outlet, an adjustable thermostatically controlled heater in said base and a wax tank, said wax tank and said water tank being so shaped that said wax tank may be inserted in and supported by said water tank, the capacity of said water tank when said wax tank is supported therein being substantially less than the minimum amount of water needed when poultry are to be immersed therein, whereby the water may be brought to a relatively high temperature to melt said wax and its temperature reduced by the addition of sufficient water to permit the poultry to be immersed therein for semi-scalding.

2. Apparatus for use in preparing poultry for the market, said apparatus comprising a base, a water tank on said base having a water inlet and a water outlet, a heater in said base, an adjustable thermostatic control for said heater, and a wax tank, said wax tank being shaped to fit within said water tank with the upper parts of said tanks in mutual contact for the support of said wax tank so that its bottom is spaced above the bottom of said water tank and inwardly of the sides thereof to present a water jacket surrounding said wax tank below said upper part, the capacity of the said water jacket being substantially less than the minimum amount of water necessary for the semi-scalding of poultry by immersion therein whereby the water may be brought to a relatively high temperature to melt wax in said wax tank and its temperature reduced to a semi-scalding temperature by the addition of sufficient water to permit the poultry to be semi-scalded therein.

3. Apparatus for use in preparing poultry for the market, said apparatus comprising a base, a thermostatically controlled heater in said base, a water tank on said base having a water inlet and a water outlet, a wax tank shaped to be inserted into and supported by said water tank to establish a water jacket surrounding said wax tank, the capacity of said water tank when said wax tank is supported therein being substantially less than the amount of water needed when poultry are to be semi-scalded by immersion therein whereby the water may be brought to a relatively high temperature to melt said wax, and on the addition of sufficient water for the semi-scalding operation the temperature of the water is sufficiently reduced, a strainer for used wax, said strainer being shaped to fit within said wax tank, and means to center said strainer when within said wax tank.

4. The apparatus of claim 3 in which the centering means comprises handles carried by the wax tank below its rim.

WINFIELD C. GARDINER.
VINCENT T. O'CONNOR.